(12) United States Patent
Hajimiri et al.

(10) Patent No.: US 11,322,990 B2
(45) Date of Patent: May 3, 2022

(54) SITUATION AWARE WIRELESS POWER TRANSMISSION

(71) Applicant: Guru Wireless, Inc., Pasadena, CA (US)

(72) Inventors: Seyed Ali Hajimiri, Pasadena, CA (US); Behrooz Abiri, Pasadena, CA (US); Farhud Tebbi, Pasadena, CA (US)

(73) Assignee: Guru Wireless, Inc., Pasadena, CA (US)

( * ) Notice: Subject to any disclaimer, the term of this patent is extended or adjusted under 35 U.S.C. 154(b) by 0 days.

(21) Appl. No.: 16/367,229

(22) Filed: Mar. 27, 2019

(65) Prior Publication Data
US 2019/0305605 A1 Oct. 3, 2019

Related U.S. Application Data

(60) Provisional application No. 62/648,873, filed on Mar. 27, 2018.

(51) Int. Cl.
*H02J 7/00* (2006.01)
*H02J 7/14* (2006.01)
(Continued)

(52) U.S. Cl.
CPC .............. *H02J 50/27* (2016.02); *H02J 7/025* (2013.01); *H02J 50/40* (2016.02); *H02J 50/80* (2016.02);
(Continued)

(58) Field of Classification Search
CPC .. H02J 50/27; H02J 50/80; H02J 50/90; H02J 50/40
(Continued)

(56) References Cited

U.S. PATENT DOCUMENTS 9,685,802 B1 * 6/2017 Mirov .................. H02J 7/0044
9,876,536 B1 1/2018 Bell et al.
(Continued)

FOREIGN PATENT DOCUMENTS

KR 20170112900 A 10/2017
WO WO-2016109316 A1 7/2016
(Continued)

OTHER PUBLICATIONS

WIPO Application No. PCT/US2019/024438, PCT International Search Report and Written Opinion of the International Searching Authority dated Aug. 1, 2019.
(Continued)

*Primary Examiner* — Alexis B Pacheco
(74) *Attorney, Agent, or Firm* — Weaver Austin Villeneuve & Sampson LLP

(57) ABSTRACT

A method of RF power delivery includes, in part, transmitting a first group of RF signals having a first group of phases to a first mobile device during a first time period. The first mobile device has a first position and a first orientation during the first time period. The method further includes, in part, transmitting a second group of RF signals having a second group of phases to the first mobile device during a second time period. The second group of phases are determined in accordance with a second position and a second orientation of the first mobile device during the second time period. The second position and second orientation are determined using sensors disposed in the first mobile device and transmitted via a wireless communications channel to an RF power generating unit transmitting the first and second group of RF signals.

27 Claims, 4 Drawing Sheets

(51) Int. Cl.
  *H02J 50/27* (2016.01)
  *H02J 50/80* (2016.01)
  *H02J 50/90* (2016.01)
  *H02J 50/40* (2016.01)
  *H02J 7/02* (2016.01)
  *G06N 20/00* (2019.01)
  *H04W 4/80* (2018.01)

(52) U.S. Cl.
  CPC .............. *H02J 50/90* (2016.02); *G06N 20/00* (2019.01); *H04W 4/80* (2018.02)

(58) Field of Classification Search
  USPC ........................................................ 320/107
  See application file for complete search history.

(56) References Cited

U.S. PATENT DOCUMENTS

| | | | | |
|---|---|---|---|---|
| 10,389,179 | B2* | 8/2019 | Hannigan | H02J 50/10 |
| 2013/0201003 | A1* | 8/2013 | Sabesan | G01S 7/42 |
| | | | | 340/10.1 |
| 2015/0091706 | A1* | 4/2015 | Chemishkian | G06K 7/10158 |
| | | | | 340/10.34 |
| 2016/0099757 | A1* | 4/2016 | Leabman | H02J 50/23 |
| | | | | 307/104 |
| 2016/0134126 | A1 | 5/2016 | Tillotson et al. | |
| 2016/0150362 | A1* | 5/2016 | Shaprio | H04W 4/023 |
| | | | | 340/539.13 |
| 2016/0204622 | A1* | 7/2016 | Leabman | H04W 4/70 |
| | | | | 307/104 |
| 2017/0110887 | A1* | 4/2017 | Bell | H02J 5/005 |
| 2017/0116443 | A1 | 4/2017 | Bolic et al. | |
| 2017/0179741 | A1* | 6/2017 | Tian | H02J 7/0044 |
| 2017/0288737 | A1 | 10/2017 | Lee et al. | |
| 2018/0269715 | A1* | 9/2018 | Hannigan | H02J 50/10 |
| 2018/0345812 | A1* | 12/2018 | Chaturvedi | B60L 11/1851 |

FOREIGN PATENT DOCUMENTS

| | | |
|---|---|---|
| WO | WO-2017053631 A1 | 3/2017 |
| WO | WO-2017171432 A1 | 10/2017 |

OTHER PUBLICATIONS

Dai, S., et al., "An Energy-Efficient Tracking Algorithm Based on Gene Expression Programming in Wireless Sensor Networks", 2009 IST International Conference on Information Science and Engineering (ICISE2009), IEEE, Dec. 26, 2009, pp. 774-777, XP031662687.
Extended European Search Report dated Nov. 29, 2021, in application No. 20190774928.

* cited by examiner

SITUATION AWARE WIRELESS POWER TRANSMISSION

CROSS-REFERENCE TO RELATED APPLICATION

The present application claims benefit under 35 USC 119(e) of U.S. Patent Application No. 62/648,873, filed Mar. 27, 2018, the content of which is incorporated herein by reference in its entirety.

FIELD OF THE INVENTION

The present invention relates to wireless power transmission.

BACKGROUND OF THE INVENTION

Wireless power transfer systems use various technologies to transfer energy from one location to another without the aid of wires, cables, or other physical connections. Radio frequency (RF), microwave and mm wave signals have been used to form beams to transfer power to a desired location while minimizing power delivery to unwanted directions. This is important for several reasons, including but not limited to, optimizing the energy transfer efficiency, avoiding potential interference with other devices, and maintaining user or operator-definable levels of electromagnetic signal strength at various locations.

Wireless power transmission through the use of RF beam forming and focusing also helps with the proliferation of internet of things (IoT) devices and sensors by delivering power while eliminating extra wiring during installation of such devices.

BRIEF SUMMARY OF THE INVENTION

A method of RF power delivery, in accordance with one embodiment of the present invention, includes, in part, transmitting a first group of RF signals having a first group of phases to a first mobile device during a first time period. The first mobile device has a first position and a first orientation during the first time period. The method further includes, in part, transmitting a second group of RF signals having a second group of phases to the first mobile device during a second time period. The second group of phases are determined in accordance with a second position and a second orientation of the first mobile device during the second time period. The second position and second orientation are determined using at least first and second sensors disposed in the first mobile device and transmitted via a wireless communications channel to an RF power generating unit transmitting the first and second group of RF signals.

In one embodiment, at least one of the sensors is a magnetometer. In one embodiment, at least one of the sensors includes a gyroscope. In one embodiment, the RF power generating unit is adapted to track the first mobile device between the first and second time periods using data the RF power generating unit receives from the first mobile device.

In one embodiment, the second orientation is the same as the first orientation. In one embodiment, the method furthers includes, in part, predicting the second position of the first mobile device. In one embodiment, the second position is predicted using one of Kalman filter or a trained artificial intelligence system. In one embodiment, the second group of RF signals are transmitted by a second RF power generating unit different from the first RF power generating unit from which the first group of RF signals are transmitted. In one embodiment, the first position is the same as the second position, and the second orientation is different from the first orientation.

In one embodiment, the method further includes, in part, detecting if the first mobile device is being carried by a person using the first and second sensors, and lowering the amount of power of the first or second RF signals if the first mobile device is detected as being carried by the person. In one embodiment, the first mobile device is adapted to provide information about its battery charge status to the RF power generating unit. In one embodiment, the mobile device is adapted to provide information about its instantaneous power consumption to the RF power generating unit.

In one embodiment, the method further includes, in part, transmitting a third group of RF signals having a third plurality of phases to a second mobile device during the second time period, and varying the power of the second group of RF signals or the third group of RF signals in accordance with either battery charge status or instantaneous power consumption of the first and second mobile devices.

In one embodiment, the method further includes, in part, increasing the power of the second group of RF signals relative to the power of the third group of RF signals if the instantaneous power consumption of the first mobile device is indicated as being greater than the instantaneous power consumption of the second mobile device. In one embodiment, the method further includes, in part, increasing the power of the second group of RF signals relative to the power of the third group of RF signals if the battery charge status of the first mobile device is indicated as being smaller than the battery charge status of the second mobile device.

In one embodiment, the generation unit includes, in part, a multitude of integrated circuits locked to a single reference frequency. In one embodiment, the generation unit includes at least one sensor.

An RF power transmission system, in accordance with one embodiment of the present invention is configured to transmit a first group of RF signals having a first plurality of phases to a mobile device during a first time period. The mobile device has a first position and a first orientation during the first time period. The RF power transmission is further configured to transmit a second group of RF signals having a second plurality of phases to the mobile device during a second time period. The second group of phases are determined in accordance with a second position and a second orientation of the mobile device during the second time period. The second position and second orientation are determined using at least first and second sensors disposed in the mobile device and transmitted via a wireless communications channel to an RF power generating unit disposed in the RF power transmission system.

In one embodiment, at least one of the sensors is a magnetometer. In one embodiment, at least one of the sensors includes a gyroscope. In one embodiment, the RF power transmission system is adapted to track the mobile device between the first and second time periods using data the RF power generating unit receives from the mobile device.

In one embodiment, the second orientation is the same as the first orientation. In one embodiment, the RF power transmission system is further configured to receive data representative of a predicted position of the mobile device. In one embodiment, the predicted position is determined using one of Kalman filter or a trained artificial intelligence algorithm. In one embodiment, the second group of RF signals are transmitted by a second RF power generating unit different from the first RF power generating unit from which the first group of RF signals are transmitted In one embodiment, the first position is the same as the second position, and the second orientation is different from the first orientation. In one embodiment, the RF power transmission is further configured to lower the amount of power of the first or second RF signals if the mobile device is detected as being carried by the person. In one embodiment, the first mobile device is adapted to provide information about its battery charge status to the RF power generating unit. In one embodiment, the mobile device is adapted to provide information about its instantaneous power consumption to the RF power generating unit.

In one embodiment, the RF power transmission system is further configured to: transmit a third group of RF signals having a third plurality of phases to a second mobile device during the second time period, and vary the power of the second group of RF signals or the third group of RF signals in accordance with either battery charge status or instantaneous power consumption of the first and second mobile devices. In one embodiment, the RF power transmission system is further configured to increase the power of the second group of RF signals relative to the power of the third group of RF signals if the instantaneous power consumption of the first mobile device is indicated as being greater than the instantaneous power consumption of the second mobile device.

In one embodiment, the RF power transmission system is further configured to: increase the power of the second group of RF signals relative to the power of the third group of RF signals if the battery charge status of the first mobile device is indicated as being smaller than the battery charge status of the second mobile device. In one embodiment, the power generation unit includes, in part, a multitude of integrated circuits locked to a single reference frequency. In one embodiment, the power generation unit includes at least one sensor.

A wireless charging system, in accordance with one embodiment of the present invention, includes, in part, at least one power generation unit transmitting a first group of RF signals having a first plurality of phases thereby to transmit an RF power, at least one recovery unit receiving and converting the transmitted RF power to a DC power wherein the recovery unit delivering the DC power to a device remotely positioned with respect to the power generating unit, one or more sensors detecting information about the state of the device, a wireless communication link via which the information is transmitted to the power generation unit, and a processor executing an algorithm to update the plurality of group of the RF signals to increase the energy transfer efficiency of the wireless charging system.

In one embodiment, the detected state includes the magnetic field. In one embodiment, the detected state includes acceleration. In one embodiment, the detected state includes the rate of rotation. In one embodiment, the detected state includes one or a more of the charge status of a battery, power consumption level, distance, or orientation of the device.

In one embodiment, the wireless charging system further includes, in part, a second recovery unit disposed in a second device, wherein the processor allocates power between the first and second recovery units in accordance with the information received from the sensors disposed in the first and second devices. In one embodiment, the processor predicts a current location and orientation of the device using one of Kalman filter or a trained artificial intelligence system. In one embodiment, the processor detects if the device is being carried by a person using the received sensor information. The wireless charging system lowers the amount of RF power it transmits if the device is detected as being carried by the person.

In one embodiment, the device is a mobile device. In one embodiment, the power generation unit includes, in part, a multitude of integrated circuits locked to a single frequency reference. In one embodiment, the generation unit includes, in part, at least one sensor. In one embodiment, the recovery unit is part of an accessory adapted to be connected to the device or is a protective case covering the device.

DETAILED DESCRIPTION OF THE INVENTION

Figure 1:
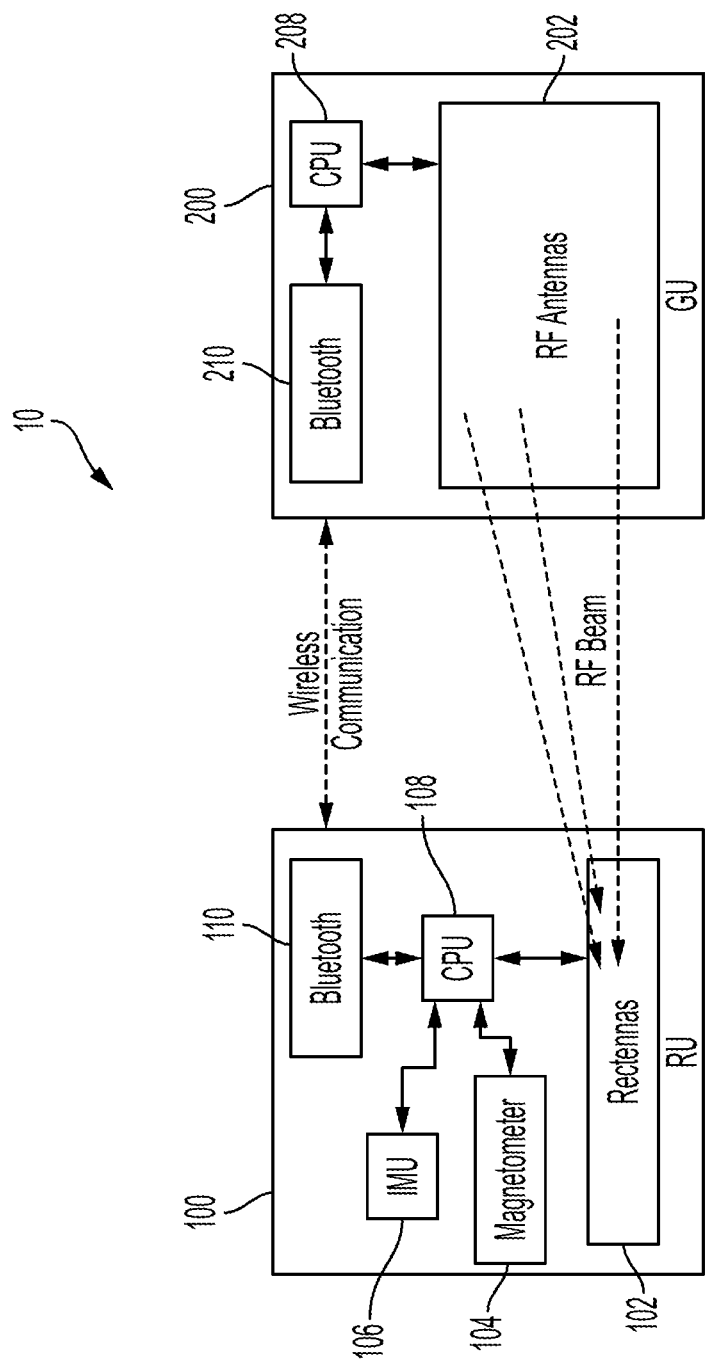
FIG. 1 is a simplified high-level block diagram of a wireless power delivery system, in accordance with one embodiment of the present invention.

A power generating unit (GU) delivering power wirelessly, in accordance with one aspect of the present invention, may include a multitude of synchronized Radio Frequency (RF) sources and antennas. The phase and amplitude of each source may be varied to enable the constructive interference in a specific location in space where the device (also referred to herein as remote device) being wirelessly charged (recovery unit or RU) is present. The transmitted signal can be generated using multiple integrated circuit (IC) that can be implemented using silicon or other semiconductor substrates that maintain synchronization by locking sources to a single frequency reference.

The recovery unit may include a number of receive antennas (rectennas) to collect the RF energy. For such power transmission process to be performed efficiently, the beam properties (for instance, its locations, orientation, choice of the sources, and the like) need to be adapted and fine-tuned to the location and orientation of the RU receiving the power. Such information may also be required for regulatory compliance, for example, to limit the RF exposure. Adjusting the power generated by the (GU) to ensure that the intensity of the radiated power remains within the required regulatory limits is a passive method of regulatory compliance and exposure control.

In accordance with another aspect of the present invention, an RU is in communication with the GU to transmit, among other things, information about the RU's location and orientation to the GU so as to, for example, control the amount of RF power the GU delivers. An RU, which may be disposed in a remote device, such as a mobile device (e.g. cell phone) or a stationary device (such as a thermostat), may include a multitude of sensors such as, an inertial (e.g., accelerometers and gyroscope) measurement sensor (unit), static magnetic field measurement sensor, a sensor(s) to perform direct measurement of the transmitted power, a global position system (GPS), a sensor(s) to perform passive measurement of other RF sources (e.g., WiFi, cellular phone, radio and television transmission, etc.), as well as sensors providing other information such as, for example, the RU's battery charge status. RU's instantaneous power consumption rate, and the like. In other embodiments, such sensors may not be a part of the recovery unit but are otherwise present in, for example, a mobile device. Such sensors and units may also be used in techniques such as inverse synthetic aperture radar (ISAR). The data collected by such sensors enhances the accuracy, reliability, and speed of location identification, leading to an improved overall system performance of a wireless power delivery system.

It is understood, that a number of components of an RU, such as circuitry to convert the received RF power to a DC power, may be present in a commercially available accessory that can be brought into electrical communication with the mobile device via, for example, a USB port of the mobile device. Such components of an RU may also present, for example, in a protective case adapted to partially or fully enclose the mobile device.

FIG. 1 is a simplified high-level block diagram of a wireless power transmission system 10, adapted to deliver power wirelessly from GU 200 to RU 100, in accordance with one exemplary embodiment of the present invention. GU 200 is shown as including a multitude of transmit antenna collectively identified as RF antenna 202, a processing unit 208, and a wireless communication circuit such as Bluetooth 210.

RU 100 is shown as including, in part, one or more rectennas 102 to receive the RF power, one or more inertial measurement unit (IMU) 106, a magnetometer 104, a processor 108, a wireless communication circuit 110 which may operate in accordance with the Bluetooth standard. RU 100 may also include WiFi, cellular phone and other circuitry, such as a GPS, not shown in FIG. 1. RU 100 is adapted to communicate with GU 200 to transmit or receive data wirelessly through the wireless communication channel established between circuits 110 and 210.

IMU 106 is adapted to provide information regarding, among other things, acceleration, deceleration and rotation of RU 100. Magnetometer 104 is adapted to measure the direction and strength of the Earth's magnetic field at the RU's location. The information provided by IMU 106, magnetometer 104, and/or other sensing circuits, such as a GPS, is used to determine the orientation and location of RU 100 and transmit this information to GU 200. Although not shown in FIG. 1, GU 200 may also include similar sensors (104, 106) as are shown as being present in RU 100.

The data collected by the various sensing/measurement units of an RU, such as those shown in FIG. 1, enable the RU to detect and measure the RU's displacement, rotation and orientation. For example, in one embodiment, a Kalman filter, or any other recursive statistical estimation algorithm, may be used by RU 100 to predict the next position, orientation and speed (collectively referred to herein as state) of RU 100 given the RU's current state. Accordingly, by comparing the predicted state of the RU against the new measurement data (which contains noise) collected by the RU, a more accurate estimate of the new state of RU 100 is obtained. In other words, the measurements made by, for example, IMU 106 and magnetometer 104 are compared and optionally augmented by the Kalman filter predictions to improve the accuracy of position, speed and orientation of RU 100. In one embodiment, Kalman filter calculations may be made by processor 108, which may be a central processing unit (CPU).

Figure 2:
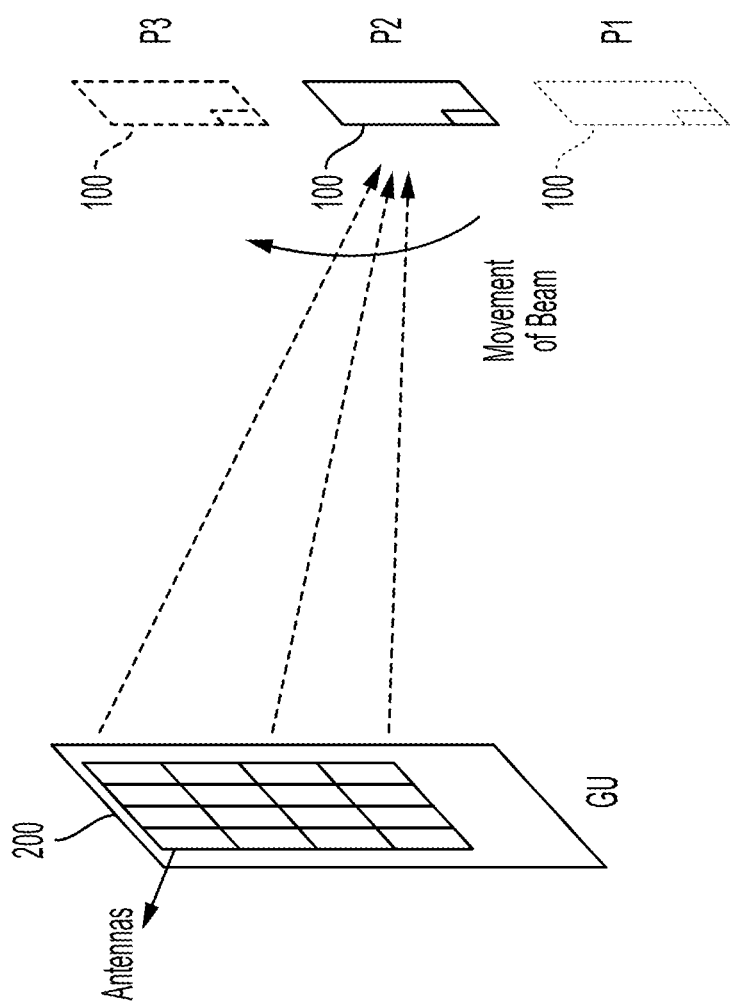
FIG. 2 shows a trajectory of a device being charged wirelessly, in accordance with one embodiment of the present invention.

FIG. 2 shows three positions of RU 100 as it moves along a path, namely its previous position $P_1$ at time $T_1$, its current position $P_2$ at time $T_2$, and its future and predicted position $P_3$ at time $T_3$ determined as describe above. RU 100 remains in communications with GU 200 to, among other things, transmit information about RU's current and predicted state. GU 200 is adapted to vary the phases of its transmit antennas so as to focus the RF beam GU 200 delivers to RU 100 as RU 100 changes its position and/or orientation. In other words, as RU 100 moves and changes position, GU 200 uses the information it receives from RU 100 regarding the predicted position of RU 100 (obtained as described above) to maintain its RF beam focused on RU 100. By adjusting the phases of its transmit antennas in response to the predicted state information of RU 100, GU 200 tracks RU 100.

In accordance with another exemplary embodiment of the present invention, speed and orientation of the RU is determined using single-value decomposition (SVD) algorithm which allows dimensionality reduction of state matrices to simplify position, speed or orientation calculations. The SVD algorithm may also be used to find the least square solutions to the system of equations that the algorithm seeks to solve. In yet another embodiment of the present invention, an artificial intelligence (AI) or machine learning system may be used to predict a future position and orientation of the RU based on the RU's trajectory.

As described above, information regarding the current and predicted position and orientation of RU 100 is used by GU 200 to adjust the phases of the signals it transmits from its transmit antennas so as to achieve real-time tracking of RU 100. This enables GU 200 to focus the RF energy it transmits on RU 100. In one embodiment, during the movement of an RU, the GU, while remaining locked to the RU, lowers the RF power it transmits so as to limit the RF exposure and comply with applicable regulatory standards.

Figure 3:
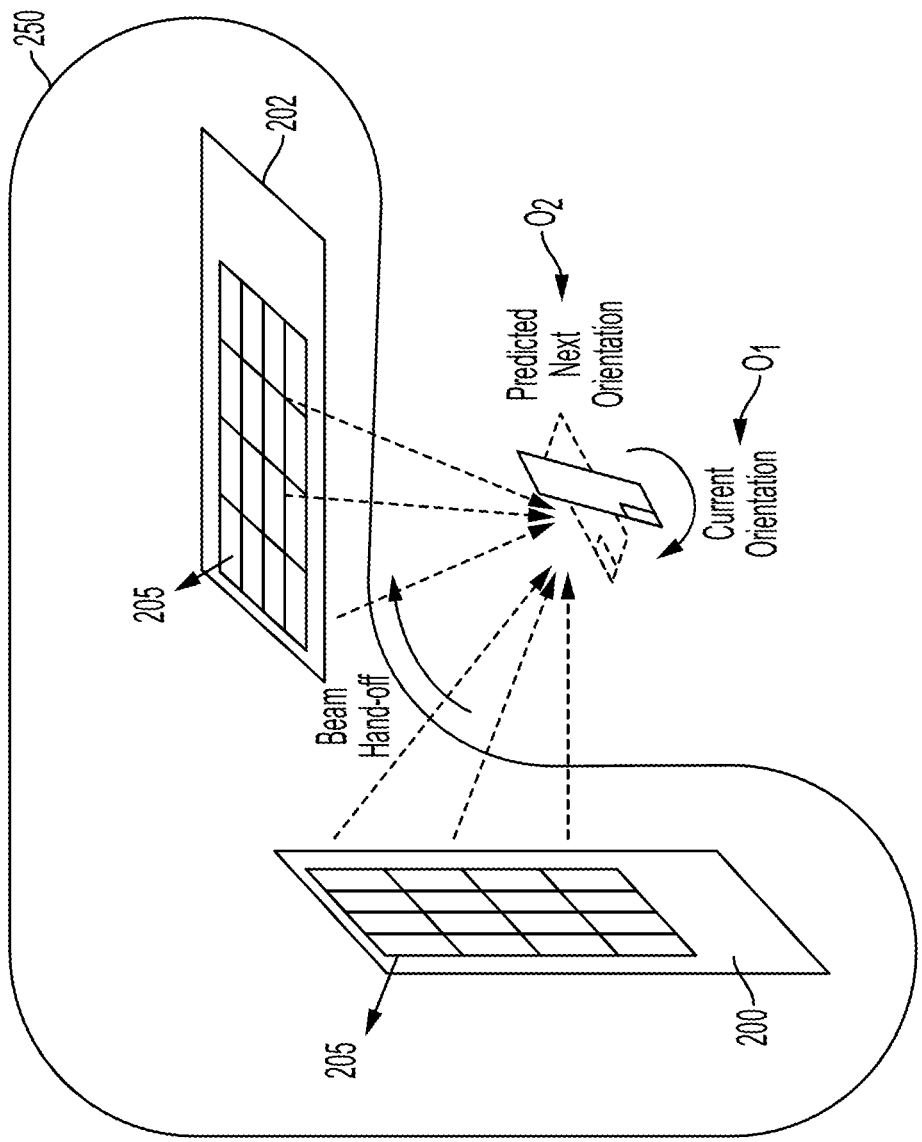
FIG. 3 shows a hand-off between a pair of RF power generating units of a wireless power transmission system, in accordance with one embodiment of the present invention.

In accordance with another embodiment of the present invention, data representative of the orientation and placement of the RU may be used in a hand-off procedure. FIG. 3 shows GUs 200 and 202 (collectively forming an RF power transmission system 250) adapted to wirelessly power RU 200. Assume during time $T_1$ when RU 100 has orientation $O_1$, the rectennas of RU 100 are oriented toward GU 100. Accordingly, during time $T_1$ the RU is charged by GU 100. Assume that the orientation of RU 100 changes to $O_2$ during time $T_2$. Assume further that when RU 100 has orientation $O_2$, RU 200's rectennas face GU 202. In accordance with embodiments of the present invention, to improve efficiency in RF power transmission, in a handoff process, GU 200 stops transmitting RF power and GU 202 starts transmitting RF power to RU 100 during time $T_2$. In other words, in accordance with one aspect of the present invention, the information provided by an RU is used to find the GU of an RF power transmission system that faces the rectennas of the RU and thus is best positioned to transfer power with highest degree of efficiency. Therefore, when the sensors in the RU detect a change in orientation, the RU informs the RF power transmission system to be prepared for handoff. Each of GUs 200 and 205 is shown as including, a multitude of antennas 205.

In some embodiments of the present invention, the calculated change in location of the focusing point of the array and the estimated rate of movement of the RU can be used to evaluate the instantaneous new location using the following expression:

$$R(t)=R(t_0)+\int_{t_0}^{t}\dot{R}(t)dt=R(t_0)+\dot{R}(t_0)(t-t_0)+\iint_{t_0}^{t}\ddot{R}(t)dtdt'$$

where R(t) is the instantaneous locations vector in 3 dimensions at time t and $\dot{R}(t_0)$ is estimated initial velocity vector at the beginning of the location estimation. The measured acceleration of the unit in three-dimensions, (for instance obtained from the three-axes accelerometers at any point in time) is shown as $\ddot{R}(t)$. An estimate of this location can be achieved by an iterative process, where the location estimate is constantly at Δt intervals using successive calculations, such as:

$$\dot{R}_{n+1} = \dot{R}_n + O_n \cdot \ddot{R}_n \Delta t$$

$$R_{n+1} = R_n + (\dot{R}_{n+1} + \dot{R}_n)\Delta t/2$$

where $O_n$ is the rotation matrix capturing the change in the orientation of the RU due to rotations, which can be estimated from the information gathered from the gyroscopes and/or magnetometers. It is used to recalculate the orientation of the frame-of-reference of the RU on an on-going basis. The rotation associated with the new frame-of-reference can be for instance calculated using a progression of rotation, e.g., $$O(t) = [\int_{t_0}^{t} \dot{O}(t)dt] \cdot O(t_0) = \int_{t_0}^{t} \Omega(t) \cdot O(t_0) dt$$

$$O_{n+1} = \Omega_n O_n \Delta t$$

where $\Omega_n dt$ is the 3×3 matrix capturing the aggregate incremental rotation along all three axes of rotation. This new orientation is also constantly applied to update the frame of reference used for location measurement. The estimated calculation is then used to define the new set of phase settings on the GU to provide constant tracking and rapid reoptimization for the new location.

In accordance with another embodiment of the present invention, the read-out from an IMU or proximity sensor disposed in an RU, together with data from a machine learning system trained to recognize human motion, may be used to determine and identify whether the RU's movement are attributed to those of a person. For example, the IMU readout together with such a learning system may be used to determine whether the RU (which may be disposed in a cell phone or any other remote device) is being carried by a person. In such an instance, the GU may adjust its transmission for safety reasons to bring the RF exposure to the required levels.

Figure 4:
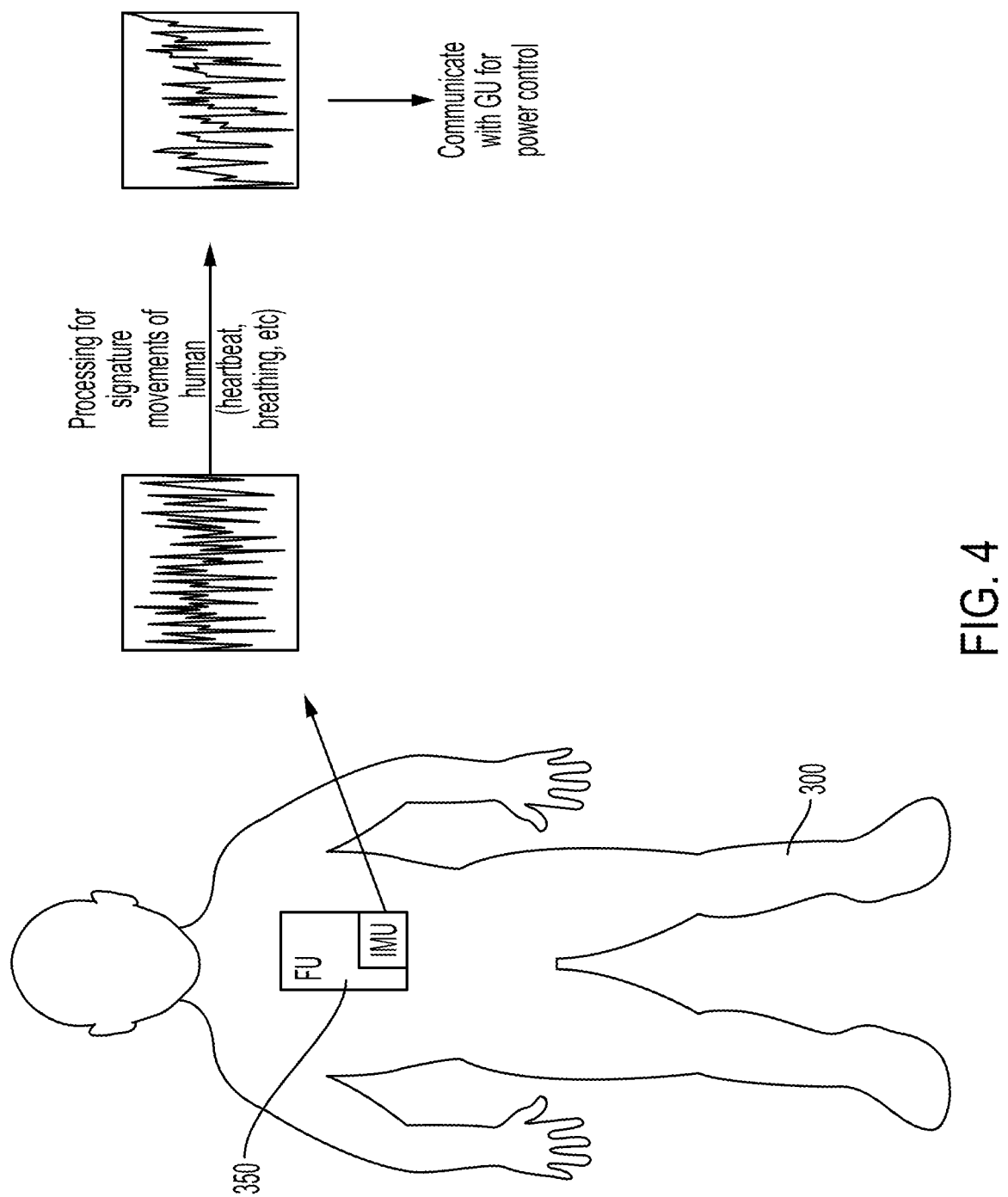
FIG. 4 shows a human carrying a wireless device being charged wirelessly, in accordance with one embodiment of the present invention.

FIG. 4 shows a human 300 carrying a portable device 350 that includes an RU. The readout from the IMU disposed in the RU may be processed to extract and detect the presence of movement characteristics associated with a human or other animate objects. Based on the signals detected by the RU, the proximity to animate objects may be detected. These characteristic movements may also be used by a classifier system/algorithm to identify the age, gender, state of activity, and the like, of the person or the location of the device with respect to the body. Based on such extracted information (and also by including the information about the distance of the RU from GU), the GU may decide to adjust its output power so as to satisfy any applicable exposure limits.

In another embodiment of the system, the data transmitted from the RU to the GU may include information, such as the energy storage and the usage of the remote system powered through the RU (for example, the battery charge level or the current energy consumption rates). Such information can be used to adjust the power transmission to various RUs being simultaneously charged to provide optimum power allocation. For example, if 4 different RUs are being simultaneously charge by the same GU, where one of the devices is at a critical power level and is operating at high performance with higher instantaneous power demand, while the other units have sufficient reserve power, the system may automatically allocate more power to the RU with the highest demand, and dynamically adjust the power allocation as the power consumption, number of units, and the charge status of various devices changes.

The above embodiments of the present invention are illustrative and not limitative. Embodiments of the present invention are not limited by the type of device that may be wirelessly charged. Other additions, subtractions or modifications are obvious in view of the present disclosure and are intended to fall within the scope of the appended claims.

What is claimed is:

1. A method of RF power delivery, the method comprising:
    transmitting a first plurality of RF signals having a first plurality of phases to a first mobile device during a first time period, said first mobile device having a first position and a first orientation during the first time period;
    transmitting a second plurality of RF signals having a second plurality of phases to the first mobile device during a second time period, wherein the second plurality of phases are determined in accordance with a second position and a second orientation of the first mobile device during the second time period, wherein said second position and second orientation are determined using at least first and second sensors disposed in the first mobile device and transmitted via a wireless communications channel to an RF power generating unit transmitting the first and second plurality of RF signals; and
    receiving, from the mobile device, information about instantaneous power consumption of the mobile device to the RF power generating unit.

2. The method of claim 1 wherein the RF power generating unit is adapted to track the first mobile device between the first and second time periods using data the RF power generating unit receives from the first mobile device.

3. The method of claim 1 further comprising predicting the second position of the first mobile device.

4. The method of claim 3 wherein said second position is predicted using one of Kalman filter or a trained artificial intelligence system.

5. The method of claim 1 wherein the second plurality of RF signals are transmitted by a second RF power generating unit different from a first RF power generating unit from which the first plurality of RF signals are transmitted.

6. The method of claim 1 further comprising:
    detecting if the first mobile device is being carried by a person using the at least first and second sensors; and
    lowering an amount of power of the first or second RE signals if the first mobile device is detected as being carried by the person.

7. The method of claim 1 further comprising:
    transmitting a third plurality of RF signals having a third plurality of phases to a second mobile device during the second time period; and
    varying a power of the second plurality of RE signals or the third plurality of RF signals in accordance with either battery charge status or instantaneous power consumption of the first and second mobile devices.

8. The method of claim 7 further comprising:
    increasing the power of the second plurality of RF signals relative to the power of the third plurality of RF signals if the instantaneous power consumption of the first mobile device is indicated as being greater than the instantaneous power consumption of the second mobile device.

9. The method of claim 7 further comprising:
increasing the power of the second plurality of RF signals relative to the power of the third plurality of RF signals if the battery charge status of the first mobile device is indicated as being smaller than the battery charge status of the second mobile device.

10. The method of claim 1 wherein the generation unit comprises a plurality of integrated circuits locked to a single reference frequency.

11. The method of claim 1 wherein the generation unit comprises at least one sensor.

12. An RF power transmission system configured to:
transmit a first plurality of RF signals having a first plurality of phases to a mobile device during a first time period, said mobile device having a first position and a first orientation during the first time period;
transmit a second plurality of RF signals having a second plurality of phases to the mobile device during a second time period, wherein the second plurality of phases are determined in accordance with a second position and a second orientation of the mobile device during the second time period, wherein said second position and second orientation are determined using at least first and second sensors disposed in the mobile device and transmitted via a wireless communications channel to an RF power generating unit disposed in the RF power transmission system; and
receive from the mobile device information about instantaneous power consumption of the mobile device.

13. The RF power transmission system of claim 12 wherein at least one of the sensors is a magnetometer.

14. The RF power transmission system of claim 12 wherein at least one of the sensors includes a gyroscope.

15. The RF power transmission system of claim 12 wherein the RF power transmission system is adapted to track the mobile device between the first and second time periods using data the RF power generating unit receives from the mobile device.

16. The RF power transmission system of claim 12 wherein said second orientation is a same as the first orientation.

17. The RF power transmission system of claim 12 wherein said RF power transmission system is further configured to receive data representative of a predicted position of the mobile device.

18. The RF power transmission system of claim 17 wherein the predicted position is determined using one of Kalman filter or a trained artificial intelligence algorithm.

19. The RF power transmission system 18 wherein the second plurality of RF signals are transmitted by a second RF power generating unit different from a first RF power generating unit from which the first plurality of RF signals are transmitted.

20. The RF power transmission system 18 wherein said first position is a same as said second position, and second orientation is different from said first orientation.

21. The RF power transmission system of claim 12 wherein said RF power transmission is further configured to lower an amount of power of the first or second RF signals if the mobile device is detected as being carried by the person.

22. The RF power transmission system of claim 12 wherein said first mobile device is adapted to provide information about its battery charge status to the RF power generating.

23. The RF power transmission system of claim 12 wherein the RF power transmission system is further configured to:
transmit a third plurality of RF signals having a third plurality of phases to a second mobile device during the second time period; and
vary a power of the second plurality of RF signals or the third plurality of RF signals in accordance with either battery charge status or instantaneous power consumption of the first and second mobile devices.

24. The RF power transmission system of claim 23 wherein the RF power transmission system is further configured to:
increase the power of the second plurality of RF signals relative to the power of the third plurality of RF signals if the instantaneous power consumption of the first mobile device is indicated as being greater than the instantaneous power consumption of the second mobile device.

25. The RF power transmission system of claim 23 wherein the RF power transmission system is further configured to:
increase the power of the second plurality of RF signals relative to the power of the third plurality of RF signals if the battery charge status of the first mobile device is indicated as being smaller than the battery charge status of the second mobile device.

26. The RF power transmission system of claim 12 wherein the generation unit comprises a plurality of integrated circuits locked to a single reference frequency.

27. The RF power transmission system of claim 12 wherein the generation unit comprises at least one sensor.

* * * * *